United States Patent
Asao et al.

(10) Patent No.: US 7,400,070 B2
(45) Date of Patent: Jul. 15, 2008

(54) ROTATING ELECTRIC MACHINE FOR VEHICLES

(75) Inventors: Yoshihito Asao, Tokyo (JP); Yutaka Kitamura, Tokyo (JP); Hiroaki Aso, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 0 days.

(21) Appl. No.: 11/501,042

(22) Filed: Aug. 9, 2006

(65) Prior Publication Data
US 2007/0035186 A1 Feb. 15, 2007

(30) Foreign Application Priority Data
Aug. 11, 2005 (JP) ............... 2005-232692

(51) Int. Cl.
*H02K 9/00* (2006.01)
(52) U.S. Cl. .............. 310/58; 310/59; 310/62; 310/63
(58) Field of Classification Search ............ 310/58–59, 310/68 D, 62–63, 263
See application file for complete search history.

(56) References Cited

U.S. PATENT DOCUMENTS

| | | | | |
|---|---|---|---|---|
| 3,838,302 A | * | 9/1974 | Dreissigacker et al. .... | 310/68 D |
| 5,552,988 A | * | 9/1996 | Kawaguchi et al. .......... | 701/70 |
| 5,677,616 A | * | 10/1997 | Ooiwa ........................ | 322/17 |
| 5,710,467 A | * | 1/1998 | Irie et al. ...................... | 310/64 |
| 5,729,063 A | * | 3/1998 | Adachi et al. ............. | 310/68 D |
| 6,184,600 B1 | * | 2/2001 | Asao et al. ..................... | 310/64 |
| 6,724,108 B2 | * | 4/2004 | Nakano ..................... | 310/68 D |
| 6,740,995 B2 | * | 5/2004 | Oohashi et al. ........... | 310/68 D |
| 6,809,443 B2 | * | 10/2004 | Nakamura et al. ........ | 310/68 D |
| 6,812,604 B2 | * | 11/2004 | Braun et al. .............. | 310/68 D |
| 7,015,607 B1 | * | 3/2006 | Ikuta et al. ................... | 310/64 |
| 7,026,733 B2 | * | 4/2006 | Bitsche et al. ............ | 310/68 R |
| 7,196,439 B2 | * | 3/2007 | Pierret et al. ................. | 310/58 |
| 2004/0041476 A1 | * | 3/2004 | Ihata et al. ................ | 310/68 D |
| 2005/0156480 A1 | * | 7/2005 | Imai et al. ................... | 310/263 |
| 2007/0035185 A1 | * | 2/2007 | Asao et al. .................... | 310/58 |

FOREIGN PATENT DOCUMENTS

JP 2004-274992 A 9/2004

* cited by examiner

*Primary Examiner*—Thanh Lam
(74) *Attorney, Agent, or Firm*—Sughrue Mion, PLLC

(57) ABSTRACT

A rotating electric machine for vehicles is capable of improving a cooling performance of switching elements forming an inverter module, and small-sizing the entire rotating electric machine. The rotating electric machine includes: a stator; a rotor, a cooling fan; a front bracket and a rear bracket; and a cover; and in which a pair of switching elements are disposed axially adjacent to each other between the rear bracket and the cover; a ventilation hole for sucking outside air is formed in a radially outer circumferential portion of the cover; and by rotation of the cooling fan, the outside air flows radially from the ventilation hole with respect to the switching elements and goes through a suction port and is discharged through a discharge port.

11 Claims, 4 Drawing Sheets

ROTATING ELECTRIC MACHINE FOR VEHICLES

BACKGROUND OF THE INVENTION

1. Field of the Invention

The present invention relates to a rotating electric machine on which a power element unit making an inverter control is mounted and, more particularly, to a power inverter type an electric rotating machine for vehicles used in, e.g., motor generators, and power steering motors.

2. Description of the Related Art

Conventionally, a power element unit for making an inverter control of a rotating electric machine, for example, as disclosed in the Japanese Patent Publication (unexamined) No. 274992/2004 (pages 17 to 19, FIGS. 1 to 5), is provided with an inverter module that is formed of a plurality of switching elements (power elements such as power transistors, MOSFET, or IGBT) and diodes connected in parallel to each of the switching elements.

In the inverter module, letting the switching element and diode forming an upper arm and the switching element and diode forming a lower arm that are connected in series one set, these three sets are connected in parallel.

An armature winding is in Y-connection. Ends of each phase of the Y-connection are electrically connected to an intermediate point between the switching elements of the upper arm and the switching elements of the lower arm that are connected in series forming one set via an AC wiring corresponding to each of the phases.

Furthermore, as to terminals of a battery, a positive electrode terminal is electrically connected to the positive electrode side of the inverter module, and a negative electrode terminal is electrically connected to the negative electrode side of the inverter module, respectively via a DC wiring.

In the inverter module, the switching operation of each of the switching elements is controlled by commands from a control circuit. Further, the control circuit controls a field current control circuit to adjust a field current to carry through the field winding of the rotor.

Since a large power loss occurs at the time of switching and conduction of the switching elements in the inverter module in driving the mentioned conventional rotating electric machine, it is a particularly important problem to be solved that each of the switching elements forming an inverter module is cooled.

For example, in the cooling system disclosed in the Japanese Patent Publication (unexamined) No. 274992/2004, a power element unit containing an inverter module is located in a circumferential direction on a heat sink at one end in an axial direction of the rotating electric machine, a cooling air is made to flow in flow paths of cooling fins one after another along the cooling fins provided with the flow paths in the radial direction, thereby cooling the heat sinks.

Since the power element unit containing an inverter module according to the mentioned prior art is located in the circumferential direction on the heat sink at one end in the axial direction of the rotating electric machine, a cooling air is made to flow in flow paths of cooling fins one after another along the cooling fins provided with the flow paths in the radial direction, thereby cooling the heat sinks, a problem exists in that a cooling air having been warmed flows into the next cooling fin, eventually resulting in lower cooling performance.

SUMMARY OF THE INVENTION

The present invention has been made to solve the problems as mentioned above, and has an object of providing an rotating electric machine for vehicles capable of improving a cooling performance of switching elements forming an inverter module, and making the entire rotating electric machine small-sized.

An rotating electric machine for vehicles according to the invention comprises a stator provided with an armature winding, a rotor including a rotary shaft and which is located inside the stator, a cooling fan located at the rotor, a housing that supports and fixes the stator, as well as supports the rotary shaft in a rotatable manner, and a cover that is located outside of one wall surface of the housing in an axial direction of the rotary shaft so as to cover the one wall surface, and that forms a space with the one wall surface of the housing. In this rotating electric machine, switching elements of an upper arm and a lower arm that are connected in series forming an inverter circuit to be connected to the armature winding are disposed adjacent to each other in the axial direction of the rotary shaft. A ventilation hole for sucking an outside air is formed in a radially outer circumferential portion of the cover. A suction port through which an air in the space is sucked into the housing is formed in the one wall of the housing. A discharge port through which the air in the housing is discharged is formed in the radially outer circumferential portion of the mentioned housing. And when the cooling fan is brought in rotation, the outside air flows in through the ventilation hole from the radially outer circumferential portion to the radially inner circumferential portion with respect to the switching elements of the upper arm and the lower arm, goes through the suction port, and then is discharged from the discharge port.

In the rotating electric machine of above construction according to the invention, it is possible to improve a cooling performance of switching elements, as well as to make the entire rotating electric machine for vehicles small-sized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
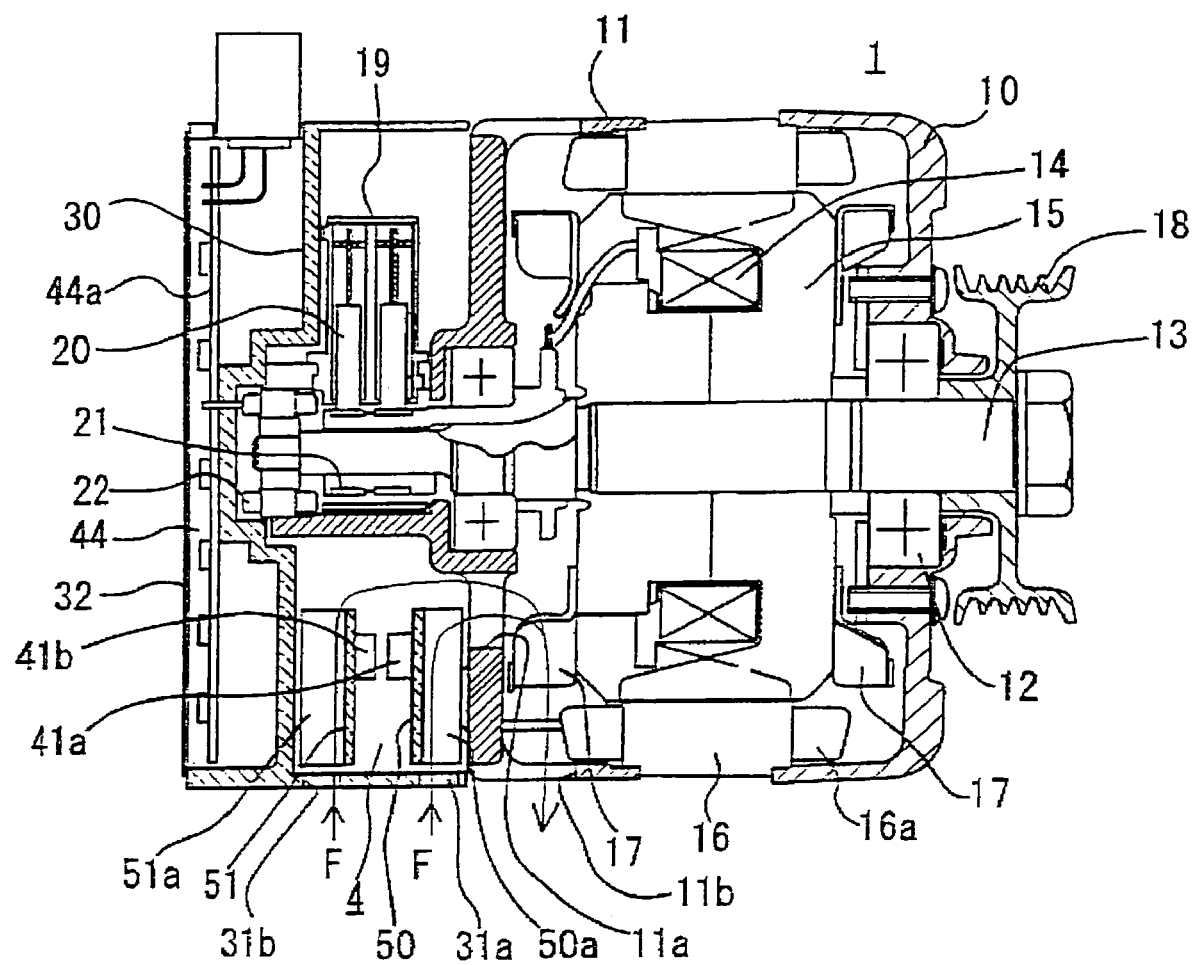
FIG. 1 is a cross sectional view showing a first preferred embodiment of an rotating electric machine for vehicles according to the present invention.

Several preferred embodiments of a rotating electric machine for vehicles according to the present invention are hereinafter described referring to the drawings.

Embodiment 1

Figure 2:
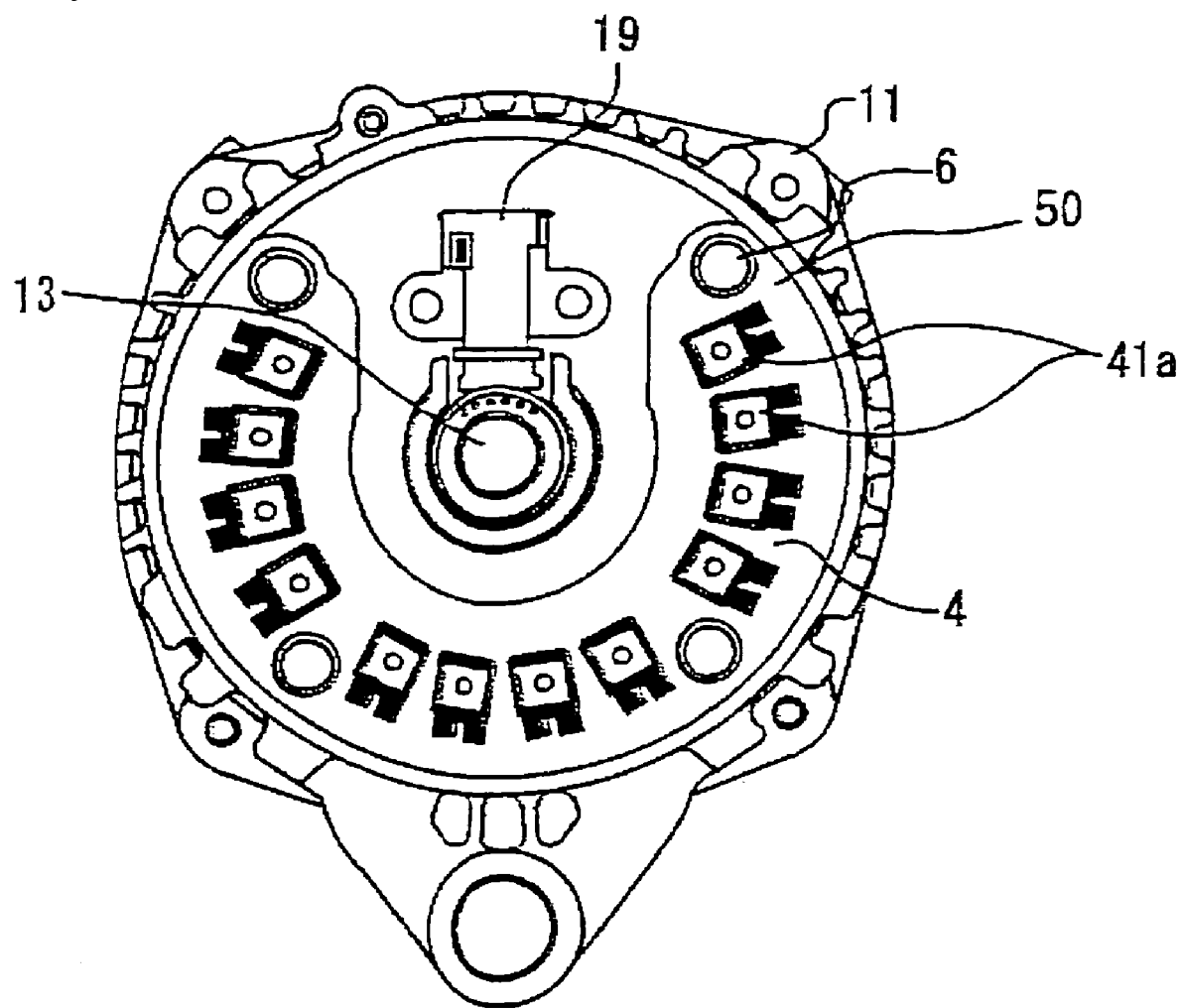
FIG. 2 is a side view taken along the axial direction of a power element unit of FIG. 1.

FIG. 1 is a cross sectional view showing a first embodiment of a rotating electric machine for vehicles according to the invention, and FIG. 2 is a side view of a power element unit of FIG. 1 taken along the axial direction. This rotating electric machine for vehicles is an electric rotating machine in which the power element unit is mounted as an integral part, or in the vicinity thereof.

As shown in FIG. 1, the rotating electric machine 1 is provided with a housing formed of a front bracket 10 and a rear bracket 11, a stator 16 including an armature winding 16a, and a rotor 15 including a shaft (rotary shaft) 13 and a field winding 14. In this rotating electric machine 1, the stator 16 is supported in and fixed to the housing, and the rotor 15 is located inside the stator 16 so that the field winding 14 thereof is opposite to the armature winding 16a; as well as the shaft 13 of the rotor 15 is supported by supporting bearings 12 that is located at the housing, and the rotor 15 can rotate coaxially with the stator 16. To both of the axial end faces of the rotor 15, cooling fans 17 are fixed.

A pulley 18 is fixed to the end portion on the front side of the shaft 13 (on the outside of the front bracket 10). A brush holder 19 is attached to the rear bracket 11 on the rear side of the shaft 13 (on the outside of the rear bracket 11); a pair of slip rings 21 is mounted onto the rear side of the shaft 13; and a pair of brushes 20 to slide in contact with the slip rings 21 is located in the brush holder 19. Further, a rotational position detection sensor (e.g., resolver) 22 is provided at the rear side end of the shaft 13. The pulley 18 is connected to a rotary shaft of an engine via a belt, not shown, and the rotation of the engine is transmitted to the pulley 18. The brush holder 19, the brushes 20 and the slip rings 21 form a power supply mechanism for supplying a DC power to the field winding 14.

A cover 30 that cover the power supply mechanism such as brush holder 19 is provided on the further rear side of the rear bracket 11. A power element unit 4 is located at a space between the rear bracket 11 and the cover 30. A control circuit board 44a on which a control circuit 44 is mounted is located on the axially outer wall surface of the cover 30, and this control circuit board 44a is covered with a plate 32.

The power element unit 4 includes a pair of an inside heat sink 50 and an outside heat sink 51 in opposition forming a predetermined gap in the axial direction. The inside heat sink 50 and the outside heat sink 51 are fixed to the rear bracket 11 with a support bar 6 shown in FIG. 2. As shown in FIGS. 1 and 2, plural sets of switching elements 41a and 41b of the upper arm and the lower arm are arrayed in a circumferential direction on the opposed inner wall surfaces in the axial direction of the inside and outside heat sinks 50 and 51. The inside and outside heat sinks 50 and 51 are provided with cooling fins 50a and 51a including flow paths in the radial direction on the axially opposed outer wall surfaces. As a result of providing the inside heat sink 50 and the outside heat sink 51, a larger cooling effect is achieved.

It is preferable that the cooling fins 50a and 51a are located all over the faces of the inside and outside heat sinks 50 and 51, or located at regular intervals in the circumferential direction.

The switching elements 41a and 41b are joined to the inside and outside heat sinks 50 and 51 by soldering respectively.

Ventilation holes 31a and 31b adjacent to each other and opposed to the outer peripheral surface of each of the cooling fins 50a and 51a are provided in the circumferential wall of the cover 30. The ventilation holes 31a and 31b are preferably open so as to be opposite to the switching elements 41a and 41b.

By the rotation of the cooling fans 17, as shown with arrows F, there is formed an air course of a fresh outside air that goes in from the ventilation holes 31a and 31b and through each of the cooling fins 50a and 51a, and is sucked from a suction port 11a of the rear bracket 11 and goes out from a discharge port 11b. Thus, the inside and outside heat sinks 50 and 51 are cooled with the outside cooling air all the times. Preferably, the suction port 11a of the rear bracket 11 is formed at portions in the vicinity of the inner circumferential ends of the cooling fins 50a and 51a in view of enhancement in cooling effect.

As mentioned above, the inside and outside heat sinks 50 and 51 are cooled by the fresh outside cooling air at all times, so that a cooling performance of cooling the switching elements 41a and 41b can be improved. Furthermore, the space between the rear bracket 11 and the cover 30 is utilized, so that the entire rotating electric machine can be small-sized.

As shown in FIG. 2, a power element unit 4 is formed of three-phases, U, V, W of sections (U-phase section, V-phase section, and W-phase section) of the switching elements 41a of the upper-side arm in which phase four switching elements 41a are connected in parallel on the wall surface of the inside heat sink 50, and three phases, U, V, W of sections (U-phase section, V-phase section, and W-phase section) of the switching elements 41b of the lower-side arm in which phase four switching elements 41b are connected in parallel on the wall surface of the outside heat sink 51. The switching element 41a and 41b may be discrete type, TPM type, or bare-chip type.

In this manner, by connecting plural numbers of switching elements 41a and 41b in parallel respectively, the amount of current to carry through each of the switching elements 41a and 41b can be made smaller. Consequently, it is possible to employ inexpensive switching elements 41a and 41b of a small current-carrying capacity, and thus to reduce costs.

Figure 3:
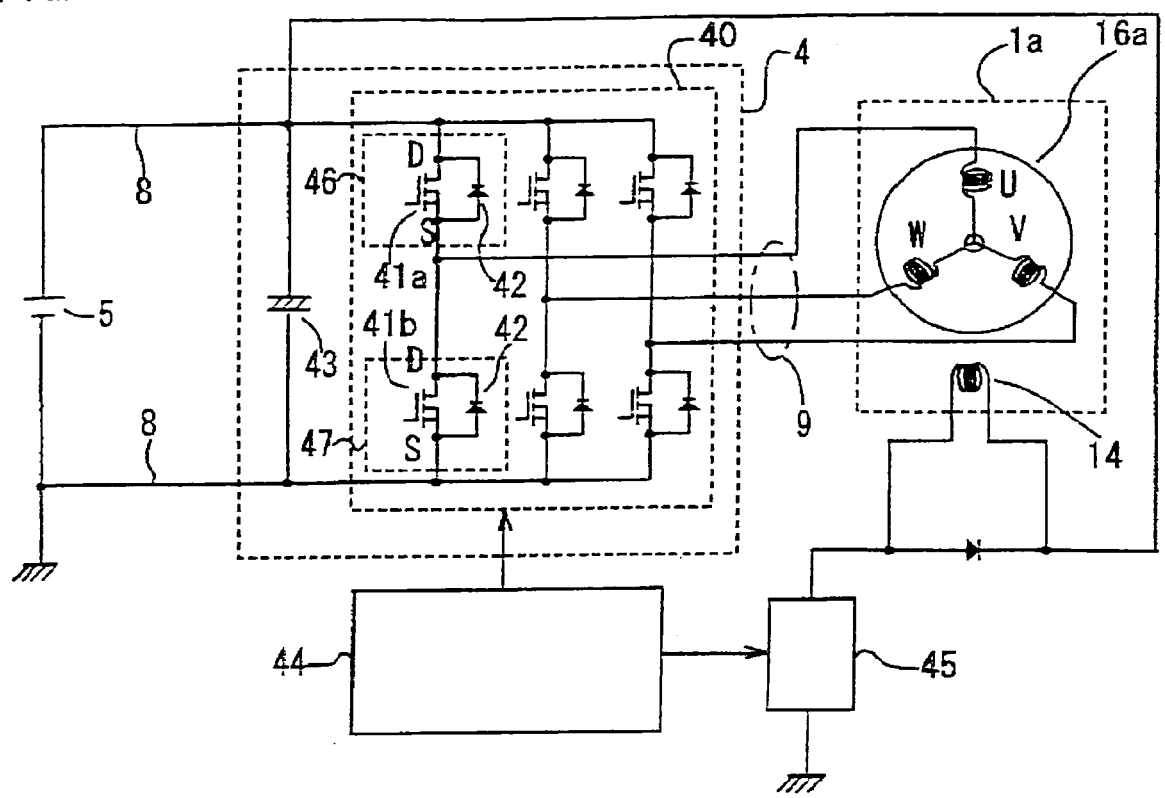
FIG. 3 is a circuit diagram for explaining operation of the rotating electric machine provided with the power element unit.

FIG. 3 is a circuit diagram for explaining operation of a rotating electric machine provided with a power element unit.

As shown in FIG. 3, a rotating electric machine section 1a is provided with an armature winding 16a wound around a stator, and a field winding 14 wound around a rotor. The armature winding 16a is constructed of three phases (U-phase, V-phase, W-phase) of coils in Y-connection (star-connection). The power element unit 4 is provided with an inverter module 40 that is formed of a plurality of switching elements (power transistor, MOSFET, IGBT or the like) 41a and 41b, and diodes 42 connected in parallel to each of the switching elements 41a and 41b, and a capacitor 43 that is connected in parallel to the inverter module 40. In the inverter module 40, the switching element 41a and diode 42 forming an upper arm 46 and the switching element 41b and diode 42 forming a lower arm 47 that are connected in series constitutes one set, and these three sets are connected in parallel.

Ends of each phase of the Y-connection in the armature winding 16a are electrically connected to intermediate points between the switching elements 41a of the upper arm 46 and the switching elements 41b of the lower arm 47 in corresponding sets via an AC wiring 9. Furthermore, a positive electrode terminal and a negative electrode terminal of a battery 5 are electrically connected to the positive electrode side and the negative electrode side of the inverter module 40 via a DC wiring 8 respectively.

The switching operation of each of the switching element 41a and 41b in the inverter module 40 is controlled by commands from a control circuit 44. Further, the control circuit 44 controls a field current control circuit 45 to adjust a field current carrying through the field winding 14 of the rotor.

With reference to the circuit diagram shown in FIG. 3, when the engine is started, a DC power is supplied to the power element unit 4 via the DC wiring 8 from the battery 5, the control circuit 44 makes ON/OFF control of each of the switching elements 41a and 41b of the inverter module 40, and the DC power is converted to a three-phase AC power. A three-phase AC power having been converted is supplied to the armature winding 16a of the rotating electric machine section 1a via the AC wiring 9, a rotating magnetic field is given around the field winding 14 of the rotor to which a field current is supplied from the battery 5 by means of the field current control circuit 45, the rotor is driven to rotate, and then the engine is started via a pulley attached to the shaft of the rotor, a belt, a crank pulley, and a clutch (ON).

When the engine is started, a rotational power of the engine is transmitted to a rotor via the crank pulley, the belt, and the pulley attached to the shaft of the rotor of the rotating electric machine section 1a, the rotor is driven to rotate resulting in induction of a three-phase AC voltage at the armature winding 16a, the control circuit 44 makes ON/OFF control of each of the switching elements 41a and 41b, the three-phase AC voltage having been induced at the armature winding 16a is converted to a DC power, and the battery 5 comes to be charged.

Embodiment 2

Figure 4:
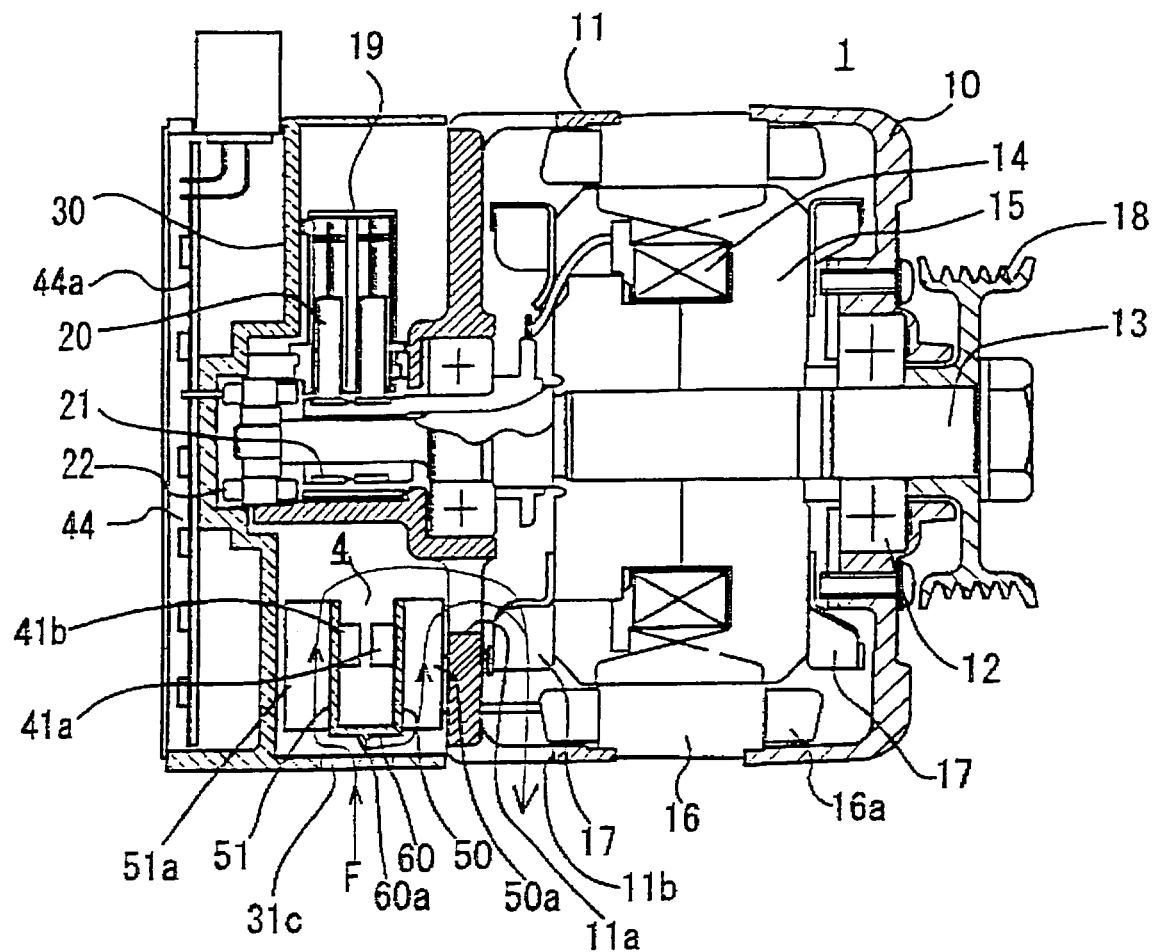
FIG. 4 is a cross sectional view showing a second embodiment of the rotating electric machine for vehicles according to the invention.

FIG. 4 is a cross sectional view showing a second embodiment of the rotating electric machine for vehicles according to the invention, and the same reference numerals indicates the same or like parts as those in FIG. 1.

With reference to FIG. 4, the construction of each part is substantially the same as in the above-mentioned first embodiment. There are differences from the first embodiment in the aspects that there is provided a ventilation hole 31c at the outer circumferential portion of the cover 30, and that there is provided a guide 60 with which a protrusion 60a having a triangular cross section is integrally formed so as to connect the outer peripheral edges of the inside and outside heat sinks 50 and 51.

According to this second embodiment, when the cooling fans 17 are brought in rotation, as indicated by the arrows F, an air course is formed such that a fresh outside air is sucked in from the ventilation hole 31c; the outside air having been sucked is distributed into two directions with the guide 60 on which the protrusion 60a is formed; and the outside air having been distributed goes through each of the cooling fins 50a and 51a, is sucked from a suction port 11a of the rear bracket 11, and goes out from the discharge port 11b.

As mentioned above, the inside and outside heat sinks 50 and 51 are cooled by a fresh outside cooling air at all times, so that a cooling performance of cooling the switching elements 41a and 41b can be improved. Further, the space formed between the rear bracket 11 and the cover 30 is utilized, so that the entire rotating electric machine can be small-sized. Furthermore, the rotating electric machine according to this second embodiment has a structure of distributing an outside air having been sucked by means of the guide 60, so that one ventilation hole 31c is sufficient, and it is possible to make the structure simple.

In addition, according to the above-mentioned first and second embodiments, although an example, in which the switching elements 41a and 41b are located at the heat sinks 50 and 51 respectively, is described, it is preferable that one of the switching elements 41a and 41b is mounted onto a heat sink, and the other switching elements are mounted on, for example, the surface of a mere resin plate. Furthermore, it is preferable that both of the heat sinks are eliminated, and that, for example, the switching elements 41a and 41b are mounted on a pair of resin plate surfaces respectively.

In addition, although a rotating electric machine for vehicles, in which the field winding 14 of the rotor 15 and the brush holder 19 are located, is described, the above-mentioned embodiments according to the invention can be applied to any other rotating electric machine for vehicles in which a magnetic pole of a rotor is formed of a permanent magnet, and there are not the field winding 14 and the brush holder 19.

The rotating electric machine for vehicles according to the invention can be effectively utilized as a rotating electric machine to be mounted on, e.g., automobiles.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A rotating electric machine for vehicles comprising:
   a stator provided with an armature winding;
   a rotor including a rotary shaft, and which is located inside said stator;
   a cooling fan located at said rotor;
   a housing that supports and fixes said stator, as well as supports said rotary shaft in a rotatable manner; and
   a cover that is located outside of one wall surface of said housing in an axial direction of said rotary shaft so as to cover said one wall surface, and that forms a space with said one wall surface of said housing;
   wherein switching elements of an upper arm and a lower arm that are connected in series forming an inverter circuit to be connected to said armature winding are disposed adjacent to each other in the axial direction of said rotary shaft;
   a ventilation hole for sucking an outside air is formed in a radially outer circumferential portion of said cover;
   a suction port through which an air in said space is sucked into said housing is formed in said one wall of said housing;
   a discharge port through which the air in said housing is discharged is formed in the radially outer circumferential portion of said housing; and
   a guide for distributing an outside air having been sucked from said ventilation hole to said switching elements of the upper arm and the lower arm respectively is provided; and
   when said cooling fan is brought in rotation, said outside air flows in through said ventilation hole from the radially outer circumferential portion to the radially inner circumferential portion with respect to said switching elements of the upper arm and the lower arm, goes through said suction port, and then is discharged from said discharge port.

2. The rotating electric machine for vehicles according to claim 1, wherein said switching elements of the upper arm and the lower arm are disposed opposite to each other in the axial direction, and there is provided a heat sink onto which at least one of said switching elements of the upper arm and the lower arm are mounted.

3. The rotating electric machine according to claim 2, wherein a plurality of cooling fins are aligned in a radial direction and regularly spaced in a circumferential direction on the heat sink on a side opposite of where at least one of said switching elements of the upper arm and the lower arm is mounted.

4. The rotating electric machine according to claim 3, further comprising a plurality of heat sinks.

5. The rotating electric machine according to claim 3, wherein the suction port is formed between an inner circumferential end of the cooling fins and the cooling fan.

6. The rotating electric machine according to claim 1, wherein a portion of the cooling fan is located directly between the suction port and the discharge port.

7. The rotating electric machine according to claim 1, wherein the switching elements are disposed facing one another.

8. The rotating electric machine according to claim 1, wherein the ventilation hole is formed immediately adjacent to said switching elements.

9. The rotating electric machine according to claim 2, wherein when the cooling fan is brought in rotation, the outside air flows in through the ventilation hole, goes along the heat sink opposite the switching elements, goes from the radially outer circumferential portion to the radially inner circumferential portion through the suction port, and then is discharged from the discharge port.

10. The rotating electric machine according to claim 2, wherein each switching element is mounted on a separate heat sink, and a plurality of cooling fins are aligned in a radial direction and regularly spaced in a circumferential direction on each heat sink on a side opposite of where the switching element of the upper arm and the lower arm is mounted.

11. The rotating electric machine according to claim 1, wherein the switching elements are arrayed along the inner circumferential wall of the cover.

* * * * *